June 24, 1947.  H. O. KLINKE  2,422,787
METHOD AND APPARATUS FOR TRIMMING AND BUTT WELDING THE
ENDS OF METAL STRIPS, PLATES, AND THE LIKE
Filed Feb. 8, 1946
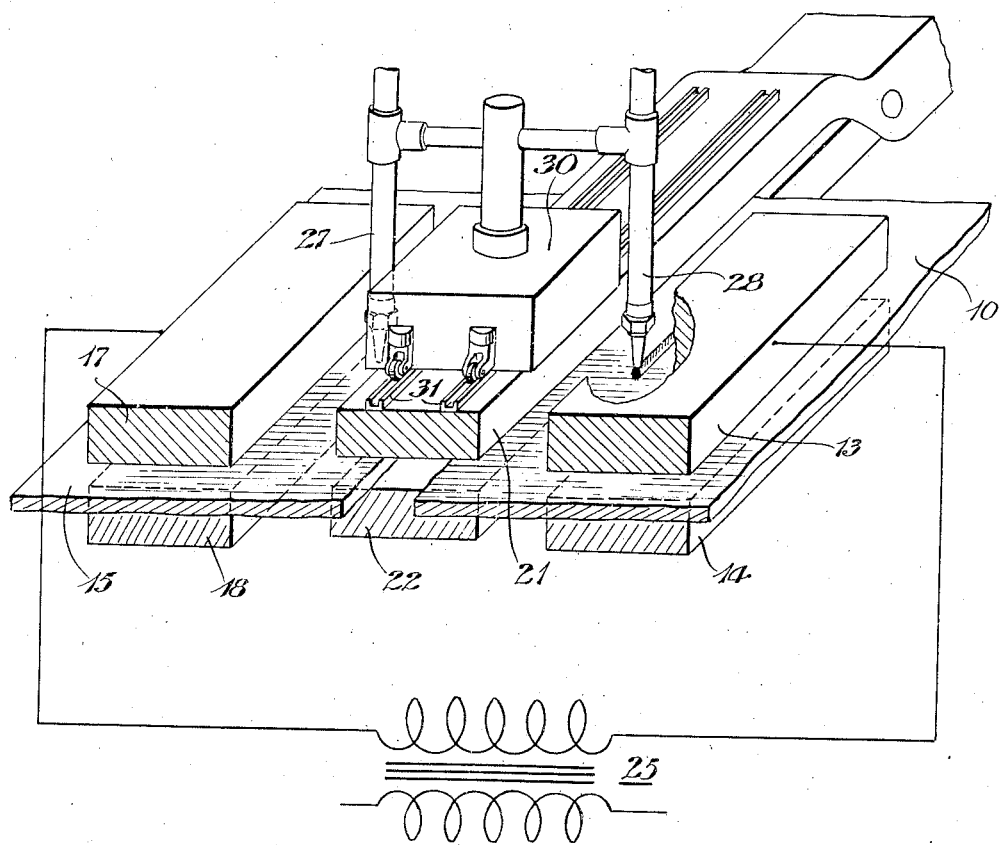
INVENTOR
Henry O. Klinke
BY
Pennie, Edmonds, Morton & Barrows
ATTORNEYS

UNITED STATES PATENT OFFICE 2,422,787

METHOD AND APPARATUS FOR TRIMMING AND BUTT WELDING THE ENDS OF METAL STRIPS, PLATES, AND THE LIKE

Henry O. Klinke, Forest Hills, N. Y., assignor to Air Reduction Company, Incorporated, a corporation of New York Application February 8, 1946, Serial No. 646,282

11 Claims. (Cl. 219—4)

This invention relates to a method and apparatus for trimming and butt welding the ends of metal strips, plates, and the like.

In processes requiring a continuous supply of strip material, such as some tube welding processes, it is common practice to weld successive new strip sections to the trailing end of the advancing strip material that is passing to the welding or other apparatus that requires the continuous supply. The new strip sections are successively welded to the end of the last strip section on the advancing strip by providing some slack in the advancing strip so that its trailing end can remain stationary long enough to weld a new strip section to it. In some cases, as in tube welding, the joints where the successive strip sections are welded to the advancing strip must be butt joints with no overlapping. Ragged edges could be welded together with a lap seam, but since the welded joints go into the finished tube, it is essential that the thickness of the metal at the welds be substantially the same as the thickness of the metal of the strip. Therefore, unless the strip sections have been previously prepared by trimming the ends, it is necessary to perform both a cutting operation to trim the ends to be welded, and a welding operation, within the short period of time during which the trailing end of the advancing strip can be held stationary.

The principal objects of this invention are to provide a method by which the ends of metal strip sections, plates, and the like, can be quickly trimmed by means of oxygen cutting torches prior to butt welding the ends together, and an improved apparatus adapted for use in carrying out the method.

In its preferred form the apparatus comprises welding equipment having two dies each with jaws adapted to grip the end portions of the strip sections at opposite sides of the region where the trimming is to take place and the weld is to be effected. A retractable clamp extends into the space between the welder dies and clamps the adjacent ragged edge portions of the strip sections that are to be trimmed off. Current is then supplied to the welder dies. Since the retractable clamp bridges the gap between the ends of the strip sections it completes the circuit through the portions of the strip sections lying between the welder dies. The current rapidly heats these portions of the strip sections to red heat, the intensity of the current being initially no greater than required to heat them to this degree. At this temperature the end portions of the strip sections can be cut at very high speed with oxygen cutting torches so a pair of such torches, mounted on a torch carriage movable transversely of the metal strip, are caused to traverse the strip sections between the welder dies to cut off the ragged end of each strip section. The retractable clamp is then retracted and carries with it the two ragged end portions which have been cut from the strip sections and which are still gripped by the clamp. The welder dies are then brought together to make a butt weld between the trimmed ends of the strip sections.

The method and the preferred form of apparatus for carrying it out are illustrated more or less diagrammatically in the accompanying drawing, the single figure of which is a perspective view of the apparatus, some parts being shown in section taken along a line parallel to the longitudinal axis of the metal strip.

Referring to the drawing, the last strip section of a strip of metal that is advancing to apparatus requiring a continuous supply of strip material, such as a continuous tube welding apparatus, is represented at 10. Its rear end portion is held between the jaws 13 and 14 of a welder die. The forward end portion of a new strip section 15, which is to be butt welded to the strip section 10, is held between jaws 17 and 18 of another welder die. Preferably, the welding equipment of which the welder dies form a part, is equipment of the flash welder type. The two welder dies being spaced apart longitudinally of the strip material clamp the end portions of the strip sections along spaced areas which extend transversely of the strip.

A retractable clamp, which is preferably a cantilever clamp having upper and lower jaws 21 and 22, can be moved into the space between the welder dies and clamped against the upper and lower faces of the ragged edge portions of the strip sections 10 and 15. A pair of oxygen cutting torches 27 and 28 are mounted on a torch carriage 30 which is movable transversely of the strip material. Preferably, the torch carriage is of a well known self-propelled type and runs on a track 31 on the top surface of the upper cantilever jaw 21. The cutting torches are so arranged that when the torch carriage moves along its track, one torch will cut the strip section 10 transversely to sever its ragged edge portion at the rear end of the strip section, and the other torch will cut the strip section 15 transversely to sever its ragged edge portion at the forward end of this strip section.

The portions of the two strip sections lying between the welder dies are heated to approximately red heat. This is conveniently accomplished by utilizing current in one of the welding circuits. When the welding equipment is of the flash welder type equipped with a circuit for supplying an amount of heat which is used to anneal the weld after it is made, the circuit for the annealing heat may be utilized to heat the end portions of the strip sections to the required temperature. This circuit is closed and power is supplied by transformer 25 to the welder dies. Since the jaws 21 and 22 of the retractable clamp bridge the gap between the ends of the strip sections 10 and 15, current flows from one welder die to the other through the portions of the strip sections lying between them and through the jaws of the retractable clamp which bridge the gap. This current rapidly heats the end portions of the strip sections to red heat and at this temperature they can be cut at very high speed by the oxygen cutting torches 27 and 28. After the torch carriage is caused to make its cutting stroke, during which the cutting torches sever the adjacent ragged edge portions of the two strip sections, the clamp comprising jaws 21 and 22 is retracted and carries with it the severed ragged edges which have been cut from the strip sections. The welder dies are then manipulated in the customary manner to flash butt weld the trimmed edges of the strip sections.

While the invention has been described as applied to the trimming and butt welding of strip sections such as those which make up strip material of the kind that is fed to continuous tube welding apparatus, it may also be used for trimming and butt welding plates and other metal objects in cases where the greater trimming speed made possible by the invention is desirable. In cases where the type of welded joint produced by resistance pressure welding equipment is suitable, for instance in trimming and welding plates for certain purposes, the welder dies may constitute part of that kind of welding equipment. However, when the invention is used for trimming and welding strip sections that make up strip material to be fed to continuous tube welding apparatus, the welder dies are preferably flash welder dies by which flash welded joints will be produced.

I claim:

1. Apparatus for trimming and butt welding the adjacent ends of metal strip sections, plates, and the like, comprising two clamping devices spaced apart longitudinally of the strip sections and extending transversely of them for clamping the end portions of the strip sections at opposite sides of the region where the trimming and welding is to be effected, a clamp adapted to occupy a position intermediate said two spaced clamping devices and in that position to clamp the adjacent edge portions of the strip sections to be severed, means for heating the portions of the strip sections between said spaced clamped devices to approximately red heat, and a pair of oxygen cutting torches mounted for movement transversely of the strip sections between said spaced clamping devices and adapted to cut the end portions of the strip sections transversely while they are thus heated to approximately red heat to sever the adjacent edge portions of the strip sections, said intermediate clamp being retractable from its position between the two spaced clamping devices transversely of the strip sections to withdraw the severed edge portions of the strip sections, and said spaced clamping devices being movable toward each other to effect a butt weld between the trimmed edges of the strip sections when they are at welding temperature.

2. Apparatus for trimming and butt welding the adjacent ends of metal strip sections, plates, and the like, comprising two clamping devices spaced apart longitudinally of the strip sections and extending transversely of them for clamping the end portions of the strip sections at opposite sides of the region where the trimming and welding is to be effected, a cantilever clamp adapted to extend into the space between said two clamping devices and in that position to clamp the adjacent edge portions of the strip sections to be severed, means for heating the portions of the strip sections between said spaced clamping devices to approximately red heat, and a pair of oxygen cutting torches mounted for movement transversely of the strip sections between said spaced clamping devices and adapted to cut the end portions of the strip sections transversely while they are thus heated to approximately red heat to sever the adjacent edge portions of the strip sections, said cantilever clamp being retractable from its position between the two spaced clamping devices transversely of the strip sections to withdraw the severed edge portions of the strip sections, and said spaced clamping devices being movable toward each other to effect a butt weld between the trimmed edges of the strip sections when they are at welding temperature.

3. Apparatus in accordance with claim 2 in which said cantilever clamp has upper and lower jaws for clamping the adjacent end portions of the strip sections to be severed and in which the oxygen cutting torches are mounted on a torch carriage guided along the top surface of the upper jaw of the cantilever clamp.

4. Apparatus for trimming and butt welding the adjacent ends of metal strip sections, plates, and the like, comprising a pair of welder dies spaced apart longitudinally of the strip sections and extending transversely of them, said welder dies being adapted to clamp the end portions of the strip sections at opposite sides of the region where the trimming and welding is to be effected, clamping means adapted to occupy a position intermediate said welder dies and in that position to clamp the adjacent edge portions of the strip sections to be severed, means for initially supplying electric current to the welder dies of an intensity such that when the current passes from one welder die to the other through the end portions of the strip sections and through the intermediate clamping means which bridges them said end portions of the strip sections are heated to approximately red heat, and a pair of oxygen cutting torches mounted for movement transversely of the strip sections between said welder dies and adapted to cut the end portions of the strip sections transversely while they are thus heated to approximately red heat to sever the adjacent edge portions of the strip sections, said intermediate clamping means being retractable from its position between the welder dies transversely of the strip sections to withdraw the severed edge portions of the strip sections, and said welder dies being movable toward each other to effect a butt weld between the trimmed edges of the strip sections when they are at welding temperature.

5. Apparatus for trimming and butt welding the adjacent ends of metal strip sections, plates, and the like, comprising a pair of welder dies spaced apart longitudinally of the strip sections and extending transversely of them, said welder dies being adapted to clamp the end portions of the strip sections at opposite sides of the region where the trimming and welding is to be effected, a cantilever clamp adapted to extend into the space between said welder dies and in that position to clamp the adjacent edge portions of the strip sections to be severed, means for initially supplying electric current to the welder dies of an intensity such that when the current passes from one welder die to the other through the end portions of the strip sections and through the cantilever clamp which bridges them said end portions of the strip sections are heated to approximately red heat, and a pair of oxygen cutting torches mounted for movement transversely of the strip sections between said welder dies and adapted to cut the end portions of the strip sections transversely while they are thus heated to approximately red heat to sever the adjacent edge portions of the strip sections, said cantilever clamp being retractable from its position between the welder dies transversely of the strip sections to withdraw the severed edge portions of the strip sections, and said welder dies being movable toward each other to effect a butt weld between the trimmed edges of the strip sections when they are at welding temperature.

6. Apparatus in accordance with claim 5 in which said cantilever clamp has upper and lower jaws for clamping the adjacent end portions of the strip sections to be severed, and in which the oxygen cutting torches are mounted on a torch carriage guided along the top surface of the upper jaw of the cantilever clamp.

7. Apparatus for trimming and flash butt welding the adjacent ends of metal strip sections, plates, and the like, comprising a pair of flash welder dies spaced apart longitudinally of the strip sections and extending transversely of them, said flash welder dies being adapted to clamp the end portions of the strip sections at opposite sides of the region where the trimming and welding is to be effected, clamping means adapted to occupy a position intermediate said flash welder dies and in that position to clamp the adjacent edge portions of the strip sections to be severed, means for initially supplying electric current to the flash welder dies of an intensity such that when the current passes from one welder die to the other through the end portions of the strip sections and through the intermediate clamping means which bridges them said end portions of the strip sections are heated to approximately red heat, and a pair of oxygen cutting torches mounted for movement transversely of the strip sections between said flash welder dies and adapted to cut the end portions of the strip sections transversely while they are thus heated to approximately red heat to sever the adjacent edge portions of the strip sections, said intermediate clamping means being retractable from its position between the flash welder dies transversely of the strip sections to withdraw the severed edge portions of the strip sections, and said flash welder dies being movable toward each other to effect a flash butt weld between the trimmed edges of the strip sections when they are at flash welding temperature.

8. The method of trimming and butt welding the adjacent ends of metal strip sections, plates, and the like, which comprises clamping the end portions of the strip sections at opposite sides of the region where the trimming and welding is to be effected and along areas which are spaced apart longitudinally of the strip sections and which extend transversely of them, clamping the adjacent edge portions of the strip sections to be severed, heating the end portions of the strip sections which lie inwardly of said spaced clamped areas to approximately red heat, thermochemically cutting the end portions of the strip sections along transverse lines while they are thus heated to approximately red heat to sever the adjacent edge portions of the strip sections, withdrawing the severed edge portions of the strip sections while still clamped, and moving the trimmed and still clamped end portions of the strip sections together to effect a butt weld between the trimmed edges of the strip sections while they are at welding temperature.

9. The method of trimming and butt welding the adjacent ends of metal strip sections, plates, and the like, which comprises clamping the end portions of the strip sections at opposite sides of the region where the trimming and welding is to be effected and along areas which are spaced apart longitudinally of the strip sections and which extend transversely of them, clamping the adjacent edge portions of the strip sections to be severed, passing electric current through the end portions of the strip sections which lie inwardly of said spaced clamped areas to heat them to approximately red heat, thermo-chemically cutting the end portions of the strip sections along transverse lines while they are thus heated to approximately red heat to sever the adjacent edge portions of the strip sections, withdrawing the severed edge portions of the strip sections while still clamped, and moving the trimmed and still clamped end portions of the strip sections together to effect a butt weld between the trimmed edges of the strip sections while they are at welding temperature.

10. The method of trimming and flash butt welding the adjacent ends of metal strip sections, plates and the like, which comprises clamping the end portions of the strip sections at opposite sides of the region where the trimming and flash welding is to be effected and along areas which are spaced apart longitudinally of the strip sections and which extend transversely of them, clamping the adjacent edge portions of the strip sections to be severed, initially passing electric current through the end portions of the strip sections which lie inwardly of said spaced clamped areas of an intensity such that it will heat them to approximately red heat, thermo-chemically cutting the end portions of the strip sections along transverse lines while they are thus heated to approximately red heat to sever the adjacent edge portions of the strip sections, withdrawing the severed edge portions of the strip while still clamped, and moving the trimmed and still clamped end portions of the strip sections together to effect a flash butt weld between the trimmed edges of the strip sections while they are at flash welding temperature.

11. The method of trimming and flash butt welding the adjacent ends of metal objects which comprises clamping the end portions of the objects at opposite sides of the region where the trimming and flash welding is to be effected, initially passing electric current through the end portions of the objects which lie inwardly of the places where the objects are clamped of an intensity such that it will heat them to approximately red heat, thermochemically cutting the end portions of the objects transversely while they are thus heated to approximately red heat to sever the adjacent edge portions of the objects, and moving the trimmed end portions of the objects together to effect a flash butt weld between the trimmed edges while they are at flash welding temperature.

HENRY O. KLINKE.